Feb. 4, 1969 A. HEINS 3,425,886
ADHESIVE COMPOSITION AND PROCESS FOR ADHESIVELY
JOINING ELASTOMERS TO METALS
Filed Oct. 29, 1962
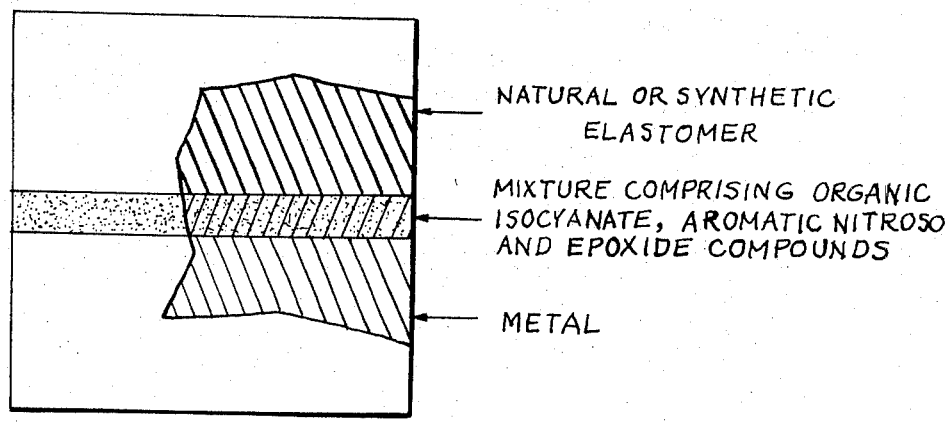
INVENTOR.
ARNOLD HEINS
BY
ATTORNEYS

United States Patent Office 3,425,886
Patented Feb. 4, 1969

3,425,886
ADHESIVE COMPOSITION AND PROCESS FOR ADHESIVELY JOINING ELASTOMERS TO METALS
Arnold Heins, Hilden, Rhineland, Germany, assignor to Henkel & Cie, G.m.b.H., Dusseldorf-Holthausen, Germany, a corporation of Germany
Filed Oct. 29, 1962, Ser. No. 233,935
Claims priority, application Germany, Jan. 11, 1962, H 44,580
U.S. Cl. 156—330    6 Claims
Int. Cl. C09j 3/00

ABSTRACT OF THE DISCLOSURE

This invention relates to a composition for forming adhesive bonds between elastomers and metals comprising essentially an admixture of (1) an organic isocyanate compound having more than one isocyanate group in the molecule, and (2) a hardenable epoxide compound having more than one epoxide group in the molecule, and (3) from about 0.5 to 10%, based on the total weight of the composition, of an aromatic C-nitroso compound, as well as the method of forming the adhesive compounds utilizing said composition.

---

This invention relates to a method and composition for bonding elastomers to solid materials, particularly metals.

In my copending application Ser. No. 232,882, filed Oct. 24, 1962, I disclose a process and composition for forming an adhesive bond between natural or synthetic elastomers and solid substances, especially metals, which is characterized in that a mixture of the following components is used as the adhesive:

(a) compounds containing more than one isocyanate group or reactive addition compounds of such polyisocyanates, and
(b) compounds containing more than one epoxide group in the molecule, said compounds containing either no aromatic radicals at all or, in addition to aromatic radicals, aliphatic chains with at least 8 chain members.

The adhesive bonds produced with the aid of this process, especially between natural or synthetic rubber and metals, exhibit excellent shear strength and peeling resistance properties. They are highly resistant against heat and against attack by chemicals, and also against the effects of prolonged exposure to hot water.

A particular advantage of this process resides in that metals can be bonded with rubber elastomers already vulcanized with the aid of adhesive mixtures described in my copending application, whereas the majority of known metal-rubber adhesives can be employed only in conjunction with the simultaneous vulcanization of the rubber. Of course, the process of the above mentioned copending patent application is also suitable for forming an adhesive bond with simultaneous vulcanization.

I have now found that this process can be substantially improved if small amounts of aromatic C-nitroso compounds are added to the above described adhesive mixture. A diagrammatic representation of my invention is shown in the figure.

Examples of organic isocyanates which may be employed in the adhesive compositions according to the present invention are the following: phenylenediisocyanate, toluylenediisocyanate, diphenylmethane-4,4'-diisocyanate, diphenylene-4,4'-diisocyanate, 3,3'-dimethoxy-4,4'-diphenylenediisocyanate (dianaisidinediisocyanate), triphenylmethanetriisocyanate, tetramethylenediisocyanate, hexamethylenediisocyanate, and decamethylenediisocyanate. It is preferred to employ those isocyanates in which the isocyanate groups are attached to an aromatic ring. In some cases it is advantageous to use, in place of the isocyanates, their reaction products which still contain at least two isocyanate groups in the molecule, such as the commercial reaction product of one mol of trimethylolpropane with 3 mols of toluylenediisocyanate. Also suitable are the so-called "capped isocyanates," that is, reaction products of isocyanates with certain compounds which contain active hydrogen atoms, such as with phenols, ethylacetate, acetylacetone, malonic ester and compounds of analogous structure. Further suitable are dimeric isocyanates (1,3-diazacyclobutane dione-2,4) and trimeric isocyanates (isocyanurate). The di- and trimers, it is well known, undergo cleavage upon being heated similar to the so-called "capped isocyanates," whereby free isocyanate groups are once again formed.

The second component of the adhesive compositions according to the present invention is a hardenable compound which contains more than one epoxide group in the molecule. In the process of my copending application Ser. No. 232,882 filed Oct. 24, 1962, satisfactory results are obtained only with certain epoxide compounds, namely, with those which contain either no aromatic radicals or, in addition to aromatic radicals, aliphatic chains with at least 8 chain members. It has surprisingly been found that the adhesive properties of a composition consisting of di- or polyisocyanates and epoxide compounds are improved so considerably by the addition of nitroso compounds that those epoxide compounds may also be used for the process according to the present invention which are not suitable for the process of the copending application.

Consequently, the second component for the adhesive compositions according to the present invention may be a variety of epoxide compounds, provided they contain on the average more than one epoxide group in the molecule. Examples of suitable compounds are the commercial products prepared from polyvalent phenols, especially diphenylolpropane, and epichlorohydrin or other epihalohydrins. Further suitable are epoxide compounds which have been produced from phthalic acid or other aromatic, aliphatic or cycloaliphatic di- or polycarboxylic acids or from anhydrides, acid esters or alkali metal salts of such acids by reaction with epihalohydrins, for instance by the process described in my copending application Ser. No. 10,029 filed Feb. 23, 1960. These epoxy groups containing hardenable compounds can be produced in a simplified way and making usage of easily available starting materials. Organic compositions which contain more than one carboxyl group in the molecule can be brought to react at elevated temperatures with halogen epoxy alkanes which contains a halogen atom in the adjacent position to the epoxy group. In place of the carboxyl group containing compositions can also be used their anhydrides together with water and/or multivalent alcohols as starting materials for the inventive process. The halogen epoxy alkane is used in a quantity of more than 2 mols per carboxyl group, or more than 4 mols per carboxylic acid anhydride group. As catalysts are added organic high molecular compositions insoluble in the reaction mixture, which contain either (a) salt groups or
(b) groups which can convert under the reaction conditions into salt groups, or
(c) acid amide groups.

For isolation of the formed epoxide compositions the catalyst has to be separated from the reaction mixture. Thereafter, the excess halogen epoxyalkane as well as the formed volatile reaction products are distilled off.

Further examples of suitable epoxide resins are those which are obtained from polyvalent alcohols by etherification with epichlorohydrin and subsequent cleavage of hydrochloric acid according to known methods, such as butanediol-1,4-diglycide ether, butanediol-1,3-diglycide ether, hexanediol-1,6-diglycide ether, decanediol-1,10-diglycide ether, octadecanediol-1,12-diglycide ether, 1,4-dimethylolcyclohexane-diglycide ether, and quinitol-diglycide ether.

Further suitable are those epoxide compounds which are obtained by epoxidation of compounds with more than one double bond, for instance, with the aid of peracetic acid. Examples of such products are epoxidized polymers and copolymers of butadiene, vinylcyclohexane-dioxide, dicyclopentadienedioxide, compounds with two unsubstituted or substituted epoxycyclohexane rings in the molecule, where the epoxycyclohexane rings are connected to each other by a variety of linking members, such as diester groups or acetal groups.

Particularly good results are also obtained in the present case with those hardenable compounds containing epoxide groups which comprise either no aromatic radicals at all or, in addition to aromatic radicals, aliphatic chains with at least 8 chain members.

The most favorable mixture ratio of the above-mentioned isocyanates and epoxide resins exists when the ratio of epoxide groups to isocyanate groups is from 1:1 to 1:5, preferably about 1:3.

Suitable C-nitroso compounds are, quite generally, those products which have one or more nitroso groups attached to an aromatic radical, such as a benzene or naphthalene radical, said nitroso groups being directly attached to a ring carbon atom.

The aromatic radicals may in addition carry other substituents. Examples of suitable compounds are the following, to mention only a few of the suitable products:

nitrosobenzene,
para-nitroso-toluene,
4-chloro-nitroso-benzene,
2-benzyl-nitroso-benzene,
4-cyclohexyl-nitroso-benzene,
3,5-dimethoxy-nitroso-benzene,
2,4-diphenyl-nitroso-benzene,
2-benzyl-4-bromo-nitroso-benzene,
2,4-dichloro-nitroso-benzene,
nitroso-naphthalene,
2-methyl-nitroso-naphthalene,
2-ethoxy-nitroso-naphthalene,
5-butyl-8-ethoxy-nitroso-naphthalene,
2-ethyl-3-methyl-nitroso-naphthalene,
1,4-dinitroso-benzene,
2,5-dinitroso-paracymene,
5-chloro-1,3-dinitroso-benzene,
2-methyl-1,4-dinitroso-benzene,
2-chloro-1,4-dinitroso-benzene,
2-ethyl-5-benzyl-1,4-dinitroso-benzene,
2,5-dichloro-1,3-dinitroso-benzene,
2,5-dicyclohexyl-3-methyl-1,4-dinitroso-benzene,
2,4-dichloro-5-cyclohexyl-1,3-dinitroso-benzene,
1,4-dinitroso-naphthalene,
2-methyl-1,4-dinitroso-naphthalene,
1-methyl-7-benzyl-2,6-dinitroso-naphthalene,
1-ethyl-5-butyl-2,7-dinitroso-naphthalene,
5,7-dichloro-1,6-dinitroso-naphthalene,
1,4,5-trichloro-2,7-dinitroso-naphthalene,
and the like.

The amount of the nitroso compounds which is added amounts to about 0.5–10%, preferably 1–3%, based on the total weight of the mixture (inclusive of filler and solvent).

The effect of the adhesive compositions according to the present invention may be further improved by adding filler materials with a large surface thereto, for example, carbon black, preferably in an amount of about 1–10% (based on the total weight of the mixture). In this manner the peeling resistance of the rubber-to-metal adhesive bonds is considerably improved.

The applicant has found that a further improvement of the adhesive bonds produced with the aid of the mixtures according to the present invention can be achieved by adding about 1–10%, preferably about 2–5% (based on the total weight of the mixture) of maleic acid anhydride.

The adhesive mixtures according to the present invention are employed as such or in the form of solutions. Suitable solvents are inert organic solvents, such as toluene, xylene, methylene chloride, trichloroethylene, dioxane, acetone, methylethyl ketone, methylisobutyl ketone, cyclohexanone, and the like.

The adhesive mixtures according to the present invention are employed by first applying the adhesive mixture to the surfaces to be adhesively bonded and, possibly after allowing the solvent to evaporate, pressing the coated surfaces together under a slight pressure. Subsequently, the hardening of the adhesive is effected preferably at elevated temperatures, between about 60 and 180° C., especially between 90 and 160° C. The hardening time depends, inter alia, upon the temperature which is used. For instance, depending upon the composition of the adhesive mixture, it may be about 10 to 30 minutes at a hardening temperature of 160° C. The applicant has further determined that the hardening of adhesives may be accelerated by a number of catalysts, for instance, by quaternary ammonium compounds, such as tetramethylammonium bromide and tetraethylammonium bromide, benzyltriethylammonium bromide, phenyltrimethylammonium bromide, tetrabutylammonium bromide, diallyldiethylammonium bromide.

Other suitable accelerators are sulfonium salts, such as a diethylmethylsulfonium bromide, diphenylmethylsulfonium bromide or hydroxyphenyldimethylsulfoniumchloride, hydroxynaphthyldimethylsulfonium bromide, hydroxytoluyldimethylsulfoniumchloride, n-octyl-hydroxyphenyl-dimethylsulfoniumchloride. The acceleration of hardening with the aid of sulfonium compounds was heretofore not known.

Other examples of suitable accelerators are pyridin-N-oxide or lead salts of carboxylic acids, for example lead naphthenate, lead oleate or lead abietate.

A great variety of elastomers and technical mixtures thereof can be adhesively joined to metals with the aid of the process according to the present invention, for instance, natural rubber, synthetic elastomers, such as polychloroprene, neoprene, polybutadiene, copolymers of butadienes, such as buna-S and buna-N, butyl rubber, brominated butyl rubber, polyurethane, and the like. These elastomers can be adhesively bonded to a variety of metals, such as to iron, steel, aluminum, copper, brass, bronze, nickel, zinc, lead, and others.

The following specific examples are given to further illustrate the invention and enable persons skilled in the art to better understand and practice the invention and are not intended to be limitative.

Unless otherwise indicated, the following test objects were used for the tests described in the following examples:

(a) strips of sheet aluminum having dimensions of 100 x 20 x 2 mm., which were rubbed with emery at the place where the adhesive bond was to be applied and which were then degreased with methylene chloride, and
(b) strips of vulcanized rubber elastomers which had a tear resistance of 25 to 40 kg./cm.$^2$ and dimensions of 100 x 20 x 2 mm., which were degreased with toluene and were roughened with fine sandpaper on the surfaces to be adhesively bonded.

These test objects were adhesively bonded over an overlapping area of 10 x 20 mm. During hardening a pressure of 0.05 kg./cm.$^2$ was applied.

EXAMPLE I 1 mol of castor oil was reacted with 3 mols of phthalic acid anhydride. The acid ester obtained in this manner was transformed into an epoxide resin having an epoxide oxygen content of 3.7% by reaction with epichlorohydrin in the presence of an ion exchanger, in the following manner: an acid ester was produced from 1 mol of castor oil and 3 mols of phthalic acid anhydride. 100 gm. of this product were heated with 900 gm. of epichlorohydrin and 100 gm. of an ion exchanger ("Lewatit MN," water-containing, in the form of its free base) for 7 hours under reflux. After cooling, the reaction mixture was separated from the catalyst by filtration. Subsequently, the excess epichlorohydrin was distilled off at a pressure of 40 mm. Hg. Finally, residual epichlorohydrin and dichlorohydrin formed during the reaction are distilled off under a a pressure of 0.5 mm. Hg until the internal temperature of the reaction mixture reached 120° C. The yield was 125 gm. This resin has an epoxide oxygen content of 2.7% and a viscosity of 460 centipoises (at 50° C.). This epoxide resin was stirred with dianisidine-diisocyanate, maleic acid anhydride, paradinitrosobenzene and commercial grade, finely divided carbon black (High Abrasion Furnace, hereinafter referred to as HAF-carbon black) as well as methylisobutyl ketone to form a homogeneous suspension. The amounts of the individual components which were used in each case are shown in Table I on the following page.

After applying the adhesive mixture and allowing the solvent to evaporate, a metal strip and a rubber strip were in each case glued together over an overlapping area of 20 x 10 mm. The adhesive was hardened by heating for 2 hours at 120° C. under a pressure of 0.05 kg./cm.². The results obtained thereby are also shown in Table I.

Mixture A

| | G. |
|---|---|
| Epoxide resin | 18.0 |
| Dianisidine-diisocyanate | 30.0 |
| Maleic acid anhydride | 1.2 |
| HAF-carbon black | 4.9 |
| Methylisobutyl ketone | 29.0 |

The epoxide resin as prepared by reacting adipic acid with epichlorohydrin in the presence of an ion exchanger, analogous to Examples 10 and 11 of Belgian Patent 588,009. It had an epoxide oxygen content of 7.0%.

Mixture A1

| | G. |
|---|---|
| Epoxide resin (as in Mixture A) | 18.0 |
| Dianisidine-diisocyanate | 30.0 |
| Maleic acid anhydride | 1.2 |
| HAF-carbon black | 4.9 |
| Methylisobutyl ketone | 29.0 |
| Para-dinitrosobenzene | 1.7 |

Mixture B

| | G. |
|---|---|
| Epoxide resin used in Example I | 18.0 |
| Dianisidine-diisocyanate | 15.6 |
| Maleic acid anhydride | 1.2 |
| HAF-carbon black | 3.5 |
| Methylisobutyl ketone | 20.6 |

Mixture B1

| | G. |
|---|---|
| Epoxide resin used in Example I | 18.0 |
| Dianisidine-diisocyanate | 15.6 |
| Maleic acid anhydride | 1.2 |
| HAF-carbon black | 3.5 |
| Methylisobutyl ketone | 20.6 |
| Para-dinitroso benzene | 1.2 |

TABLE I

| Test No. | Epoxide resin, g. | Dianisidine diisocyanate, g. | Maleic acid anhydride, g. | Dinitroso benzene, g. | HAF-carbon black, g. | Methyl isobutyl ketone, g. | Peeling resistance | Condition after break |
|---|---|---|---|---|---|---|---|---|
| A | 3 | 3.1 | 0.2 | | 0.63 | 3.0 | Good | Separation in the adhesive layer, little tearing on the rubber surface. |
| B | 3 | 3.1 | 0.2 | 0.1 | 0.63 | 3.0 | Excellent | Adhesive bond unchanged; smooth break of rubber. |
| C | 3 | | 0.2 | 0.1 | 0.32 | 1.5 | No bond | Adhesive still liquid. |
| D | | 3.1 | 0.2 | 0.1 | 0.33 | 1.55 | No bond | Adhesive layer dry. |

EXAMPLE II

The following tests were performed without the addition of isocyanate, with a customary combination of epoxide resin and amine hardener. They show that in this instance substantially poorer results were obtained than with the composition according to the present invention.

Four different batches of mixture consisting of 5 g. of the epoxide resin used in Example I, 2 g. of a commercial polyamide containing free amino groups (commercial product Versamid 140), 0.7 g. of HAF-carbon black, and 2 g. of xylene were stirred into a homogeneous suspension, one batch without adhesive and the three other batches after adding 0.1, 0.2 and 0.3 g. of para-dinitrosobenzene, respectively. The individual adhesive samples were, as described in Example I, applied to prepared aluminum and rubber strips, and after pressing the surfaces together, the bonds were hardened for 2 hours at 120°C. The adhesive test bonds did not differ quantitatively from each other. In all cases the peeling resistance of the metal-to-rubber bonds was very small. No break in the rubber was observed.

EXAMPLE III

For quantitative investigation of the effect of the para-dinitrosobenzene, the following adhesive mixtures were prepared:

The above described mixtures were transformed into homogeneous adhesive suspensions by treatment for one hour in a ball mill, and these suspensions were applied to the surfaces to be adhesively bonded in the same manner as described in Example I. After allowing the solvent to evaporate, the surfaces were joined and thereafter hardening was effected under a pressure of 0.1 kg./cm.² over a period of two hours at a temperature of 120°C.

Strips of sheet steel were adhesively bonded with a variety of vulcanized rubber elastomers pursuant to ASTM Test D429–56–T, Method B, and then the tear resistance (kg./inch) was determined by a peeling test at an angle of 45°. The results (average from 3 measurements) are summarized in the following table:

TABLE II

| Adhesive mixture | Peeling resistance of natural rubber | Natural rubber with pine needle tar (kg./inch) | Adhesive bond of natural rubber-styrene-butadiene |
|---|---|---|---|
| A | 15.6 | 31.9 | 32.1 |
| A1 | 32.0 | 43.8 | 30.8 |
| B | 12.7 | 8.5 | 13.8 |
| B1 | 41.4 | 39.6 | 34.7 |

EXAMPLE IV

An epoxide resin was prepared by reaction of phthalic acid with epichlorohydrin in the presence of an ion exchanger by the following method: 166 gm. of o-phthalic acid were refluxed with 80 gm. of a commercial anion exchanger resin which was swollen with water and contained water, and 3700 gm. of epichlorohydrin for 5 hours. After cooling, the reaction mixture was separated from the catalyst by filtration. Subsequently, the excess epichlorohydrin was distilled off at a pressure of 40 mm. Hg. Finally, residual epichlorohydrin and dichlorohydrin formed during the reaction are distilled off under a pressure of 0.5 mm. Hg until the internal temperature of the reaction mixture reached 120°C. The residue consisted of 310 gm. of a very light, liquid epoxide resin having the following characteristic values:

| | |
|---|---|
| Epoxide oxygen content percent | 6.5 |
| Chlorine do | 7.5 |
| Nitrogen | Not detectable |
| Viscosity at 50°C. (This viscosity value and those given in the subsequent examples were determined with the aid of the Hoppler-Viscosimeter.) cp | 450 |
| Color according to Lovibond (1″ dish): 9.0 yellow, 1.7 red. | |

3 g. of this resin, were stirred with 5 g. of dianisidin-diisocyanate, 0.8 g. of HAF-carbon black, 0.25 g. of paradinitroso-benzene and 3.8 g. of methylisobutyl ketone to form a homogeneous suspension. Adhesive bonds between vulcanized rubber and aluminum were produced with the aid of this adhesive composition in the same manner as described in Example I. A very good bond was obtained which could be separated only by tearing the rubber.

EXAMPLE V 3 g. of a commercial epoxide resin (commercial product Araldit F), produced by reaction of bisphenol-A with epichlorohydrin and having an epoxide oxygen content of 8.3%, 5.9 g. of dianisidine-diisocyanate, 0.9 g. of HAF-carbon black, 0.28 g. of para-dinitrosobenzene, and 4.2 g. of methylisobutyl ketone were milled to form a homogeneous suspension. Strips of aluminum and vulcanized rubber were adhesively bonded with the aid of this adhesive mixture in the same manner as described in Example I. An excellent adhesive bond was formed which could not be separated. In a pulling test the rubber strips were torn.

EXAMPLE VI 9 g. of the epoxide resin used in Example I, 7.7 g. of dianisidine-diisocyanate, 0.2 g. of maleic acid anhydride, 1.74 g. of HAF-carbon black and 8.4 g. of methylisobutyl ketone were milled into a thin liquid suspension. 0.06 g. of nitrosobenzene were dissolved in 3 g. of this suspension. When this composition was used to form an adhesive bond between vulcanized rubber and aluminum as described in Example I, an excellent bond was formed which could only be separated by tearing the elastomer.

EXAMPLE VII 3 g. of the epoxide resin used in Example I, 2.57 g. of dianisidine-diisocyanate, 0.2 g. of maleic acid anhydride, 2.8 g. of methylisobutyl ketone and 0.18 g. of para-dinitrosobenzene were intimately admixed with each other. A light-colored suspension was obtained in this manner. Strips of rubber were adhesively bonded to strips of aluminum, copper and stainless steel (V₄A) with the aid of this mixture as described in Example I.

In all instances very good adhesive bonds were formed which could only be separated by partially tearing the rubber.

These tests were repeated, excepted that 0.58 g. of HAF-carbon black were added to the mixture. In this manner a still higher peeling resistance and a more uniform consistency of the hardened adhesive layer were achieved.

EXAMPLE VIII 3 g. of the epoxide resin described in Example I, 2.16 g. of 4,4′-diphenylmethane-diisocyanate, 0.2 g. of maleic acid anhydride, 0.54 g. of HAF-carbon black and 0.17 g. of para-dinitrosobenzene were admixed with 2.53 g. of methylisobutyl ketone and the mixture was stirred into a homogeneous suspension. When aluminum, copper and stainless steel (V₄) were adhesively bonded to vulcanized rubber, analogous to Example I, adhesive bonds were obtained which could be separated in a peeling test only by tearing the rubber.

EXAMPLE IX 3 g. of the epoxide resin used in Example I, 1.5 g. of hexamethylene-diisocyanate-1,6, 0.2 g. of maleic acid anhydride, 0.5 g. of HAF-carbon black and 0.15 g. of para-dinitrosobenzene were admixed with 2.2 g. of xylene and the mixture was homogenized. When this mixture was used for adhesively bonding aluminum, copper, brass and stainless steel with vulcanized rubber elastomers, analogous to Example I, an adhesive bond of high peeling resistance was formed.

EXAMPLE X 3 g. of the epoxide resin used in Example I, 1.52 g. of toluylene-diisocyanate, 0.45 g. of HAF-carbon black and 0.15 g. of para-dinitrosobenzene were milled into a homogeneous suspension without the addition of a solvent. The adhesive composition obtained in this manner was used for adhesively bonding aluminum, copper, steel and stainless steel (V₄A) with vulcanized rubber. Adhesive bonds of excellent strength were obtained in this manner. In a peeling test a break of the rubber occurred.

EXAMPLE XI 3 g. of the epoxide resin which is commercially available under the mark Epoxide 201, and which, pursuant to the statements of the manufacturer, has the following formulation:

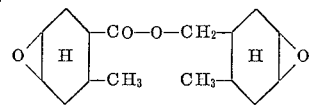

exhibits an epoxide oxygen content of 10.5%, 7.1 g. of dianisidine-diisocyanate and 1 g. of HAF-carbon black were milled to a homogeneous mixture with 4.75 g. of methylisobutyl ketone. Aluminum strips were adhesively bonded with strips of vulcanized rubber with the aid of this mixture in the same manner as described in Example I. Merely a loose bond was formed. However, when 3 g. of the above described adhesive composition were admixed with 0.09 g. of para-dinitrosobenzene and the resulting mixture was used for forming an adhesive bond according to Example I, bonds with a high peeling resistance were obtained.

I claim:
1. In a composition for forming adhesive bonds comprising esesntially an admixture of (1) an organic isocyanate compound selected from the group consisting of phenylene-diisocyanate, toluylene-diisocyanate, diphenylmethane-diisocyanate, diphenylene-diisocyanate, dianisidine-diisocyanate, triphenylmethane-triisocyanate, tetramethylene-diisocyanate, hexamethylene-diisocyanate, decamethylene-diisocyanate and the reaction product of one mol of trimethylolpropane with three mols of toluylene-diisocyanate and (2) a hardenable epoxide compound having more than one epoxide group in the molecule, where the ratio of said epoxide groups to said isocyanate groups in said admixture is from 1:1 to 1:5, the improvement which consists of an addition to said admixture of from about 0.5 to 10 percent based on the total weight of the composition of an aromatic C-nitroso compound where the aromatic moiety is selected from the group consisting of benzene and naphthalene, whereby said composition forms adhesive bonds between elastomers and metals.

2. The composition of claim 1 wherein said aromatic C-nitroso compound is present in said composition in an amount of from about 1 to 3 percent, based on the total weight of the composition.

3. The composition of claim 1 wherein from about 1 to 10 percent of carbon black is present.

4. The composition of claim 1 wherein from about 1 to 10 percent of maleic acid anhydride is present.

5. The method of forming an adhesive bond between vulcanized elastomers and metals which comprises applying the composition of claim 1 to the surfaces to be bonded, joining said surfaces and subjecting said joined surfaces to a temperature of between about 60° C. and 180° C.

6. The method of claim 5 wherein said composition is applied to said surfaces in an inert organic solvent.

References Cited

UNITED STATES PATENTS

| | | | |
|---|---|---|---|
| 3,158,586 | 11/1964 | Krause | 260—830 |
| 3,307,966 | 3/1967 | Shoaf | 161—184 |
| 2,872,427 | 2/1959 | Schroeder. | |
| 2,905,582 | 9/1959 | Coleman et al. | |
| 3,032,460 | 5/1962 | Chipman et al. | 156—330 |
| 3,048,552 | 8/1962 | Fang | 260—45.4 |
| 3,100,756 | 8/1963 | Fry | 260—42 |

FOREIGN PATENTS

| | | |
|---|---|---|
| 1,030,325 | 5/1958 | Germany. |
| 1,030,824 | | Germany. |

ROBERT F. BURNETT, *Primary Examiner.*

W. J. VAN BALEN, *Assistant Examiner.*

U.S. Cl. X.R.

260—830; 161—184, 186, 190; 117—75